July 7, 1959 A. H. KENT 2,893,738

AUTOMATIC SOUND REPRODUCING DEVICE

Filed Aug. 7, 1953 3 Sheets-Sheet 1

INVENTOR
ALLEN H. KENT

BY Ostrolenk & Faber
ATTORNEYS

July 7, 1959

A. H. KENT 2,893,738

AUTOMATIC SOUND REPRODUCING DEVICE

Filed Aug. 7, 1953

3 Sheets-Sheet 2

INVENTOR
ALLEN H. KENT

BY Ostrolenk & Faber

ATTORNEYS

July 7, 1959 A. H. KENT 2,893,738
AUTOMATIC SOUND REPRODUCING DEVICE
Filed Aug. 7, 1953 3 Sheets-Sheet 3
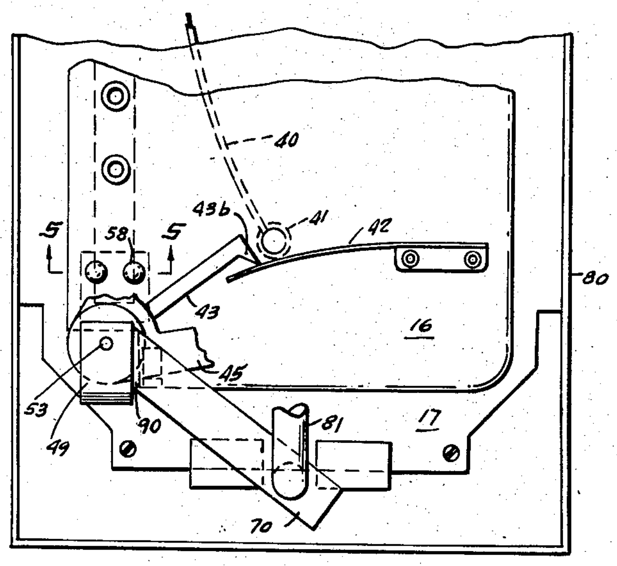
FIG. 4
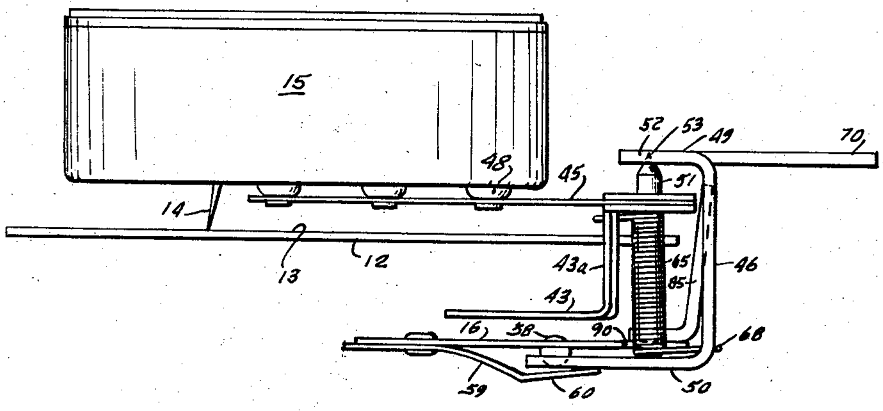
FIG. 5 FIG. 6
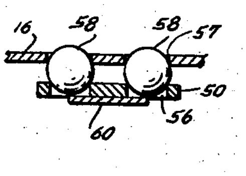
INVENTOR
ALLEN H. KENT
BY Ostrolenk & Faber
ATTORNEYS United States Patent Office 2,893,738

Patented July 7, 1959

2,893,738

AUTOMATIC SOUND REPRODUCING DEVICE

Allen H. Kent, New York, N.Y.

Application August 7, 1953, Serial No. 372,995

4 Claims. (Cl. 274—9)

My invention relates to novel sound reproducers for use in advertising devices and toys and so arranged that the pressing of an arm by means of operating or pressing a member appropriate to the device or toy will initiate the operation of the sound reproducer, permit it automatically to go through a cycle of sound reproduction at the end of which it will automatically stop prepared for operation once more as a result of another pressure of the arm.

In prior sound reproducers of this type, the major difficulties have been the maintenance of proper tracking in the groove of the record disc in all attitudes (including inversion) of the unit, an accurate and positive return at all attitudes of the unit and assembly of the various portions of the unit by mass production techniques involving the utilization of limited skill.

A major object of the present invention is the provision of a relatively constant tension biasing means on the stylus carrying arm so arranged that it will provide substantially constant lateral groove tracking pressure on the stylus at all positions of the stylus in the record groove; the said biasing means also serving to provide an automatic return for the stylus carrying arm when the stylus carrying arm is operated to lift the stylus from the record groove.

Another important object of the present invention is the arrangement of the mounting means for the stylus carrying arm and the biasing means for driving the arm toward the record (as distinguished from the first mentioned biasing means) so that they are simple in operation and capable of simplified assembly procedures.

Another object is the construction of the entire unit so that it may readily be assembled by mass production techniques.

It is, therefore, also an object of the present invention to provide a generally improved phonograph of the character described in which the sound reproducer is resiliently supported and biased in such a manner that the record may be played without danger of the stylus jumping out of the sound track regardless of the position assumed by the phonograph unit.

Still another object resides in the provision of a resetting mechanism of novel construction which, when actuated, will lift the sound reproducer relative to the record and automatically position the stylus for engagement with the outer terminus or commencement of the sound track.

A further object is to provide a phonograph unit of the character described in which the sound reproducer is carried by a resilient member pivotally mounted for movement in an arc across the face of the record and normally biased toward the outer edge of said record.

A further object of the present invention resides in the provision of a phonograph unit of the character described in which the sound reproducer is carried by a resilient member pivoted for movement in an arc across the face of the record and in which the pivot is tiltable for movement of the sound reproducer toward and away from the face of the record and is normally biased by a spring for movement of the sound reproducer toward the face of the record with the stylus in engagement with the spiral groove with a predetermined spring pressure.

The above and other objects of my invention will become more apparent from the following description when taken in conjunction with accompanying drawings illustrating a preferred embodiment of the invention.

Referring to the drawings in which numerals of like character have been used to designate similar parts throughout the several views;

Figure 4 is a fragmentary top plan view of the phonograph unit with the turntable removed.

Figure 5 is a sectional view taken along line 5—5 of Figure 4 and

Figure 6 is a detail view in side elevation of the resilient support and resetting mechanism for the sound reproducer.

Figure 1:
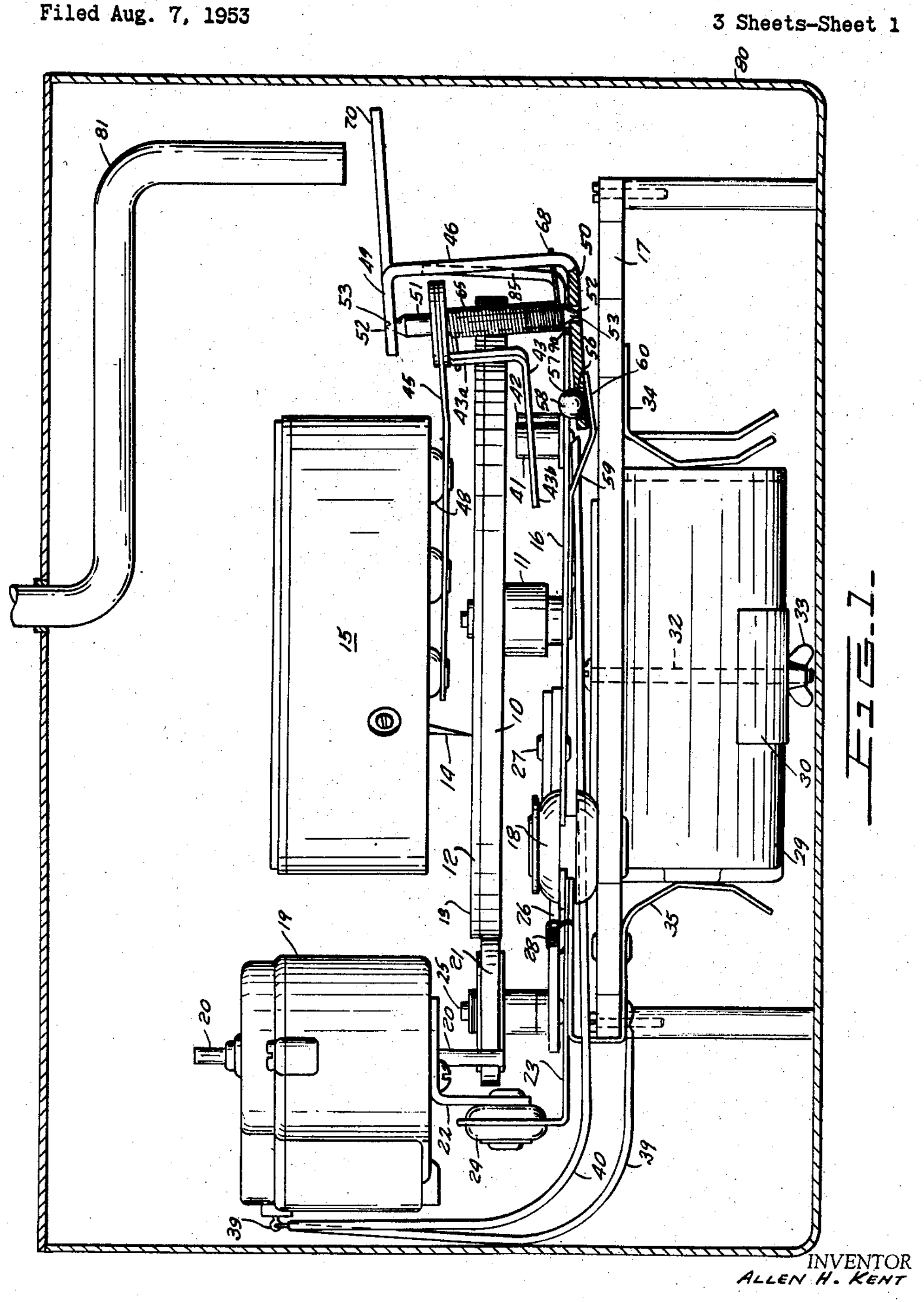
Figure 1 is a longitudinal section taken through one side of a phonograph housing showing a phonograph unit embodying my invention in place therein with certain parts of the unit shown in section and other parts broken away.

Referring in detail to the drawings and more particularly to Figure 1, turntable 10 of my novel miniature phonograph mechanism is rotatably mounted on a stud shaft 11. A record disc 12 having the usual spiral sound track or groove 13 is mounted on turntable 10 for engagement by the stylus 14 of a sound reproducer unit 15 of any well-known construction and design. The shaft 11 is mounted on a frame plate 16 which in turn is mounted on a supporting base member 17 and spaced therefrom by means of rubber grommets or the like 18 which serve to dampen the vibrations produced by rotation of the motor 19.

The turntable 10 is rotated at a predetermined speed by a small electric motor 19 having a drive shaft 20. The drive shaft 20 is operatively connected to the turntable 10 through the medium of a friction surfaced idler 21 or other suitable driving connection. The motor 19 is mounted on a bracket 22 which is riveted or otherwise secured to the vertical leg of an angle plate 23, the horizontal leg of which is spot welded or otherwise secured to the underside of the frame plate 16. In order to take up the motor vibrations and thereby reduce the motor noise to a minimum, rubber grommets 24 or other suitable cushioning means are preferably interposed between the bracket 22 and the adjacent leg of the angle plate 23 as shown.

Figure 2:
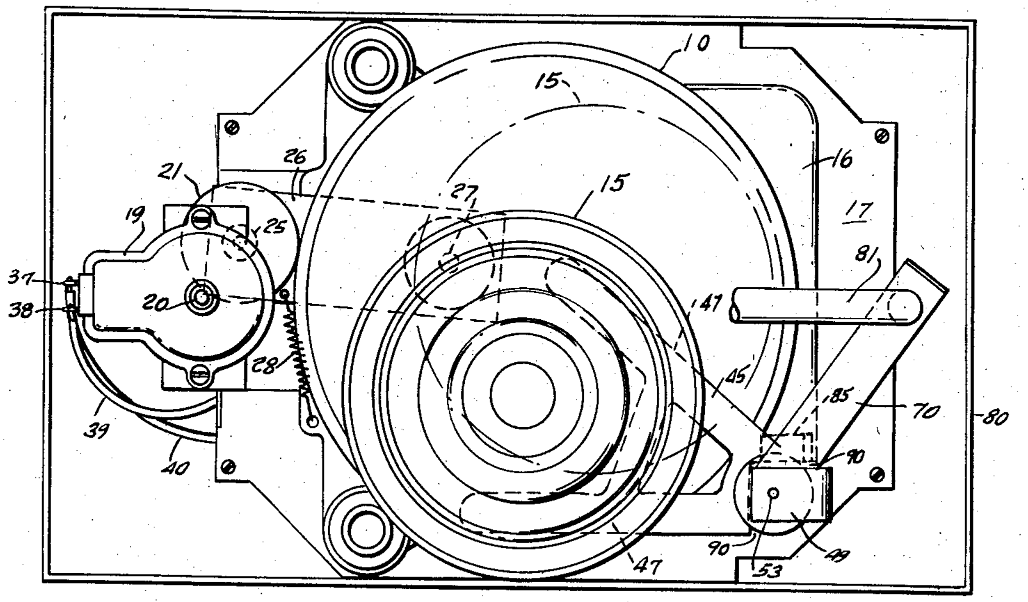
Figure 2 is a top plan view looking down on the phonograph unit in the housing.

The idler 21 is freely rotatable on a shaft 25 carried by a supporting arm 26 which is floatingly mounted as at 27 (Figure 2) on the frame plate 16. A coil spring 28 cooperates with the arm 26 for yieldably maintaining the idler 21 in frictional engagement with the motor shaft 20 and the periphery of the turntable 10.

Power for operating the motor 19 is supplied by a pair of small batteries or dry cells 29 such as commonly used in flashlights. The batteries 29 are disposed on the underside of the base member 17 and are removably secured in place by any suitable means, that shown by way of example comprising a clamping plate 30 having a central opening to receive the projecting end of a threaded bolt 32 secured at its opposite end to the base member 17. A wing nut 33 threaded onto the outer end of the bolt 32 maintains the clamping plate 30 in clamping engagement with the batteries 29.

Figure 3:
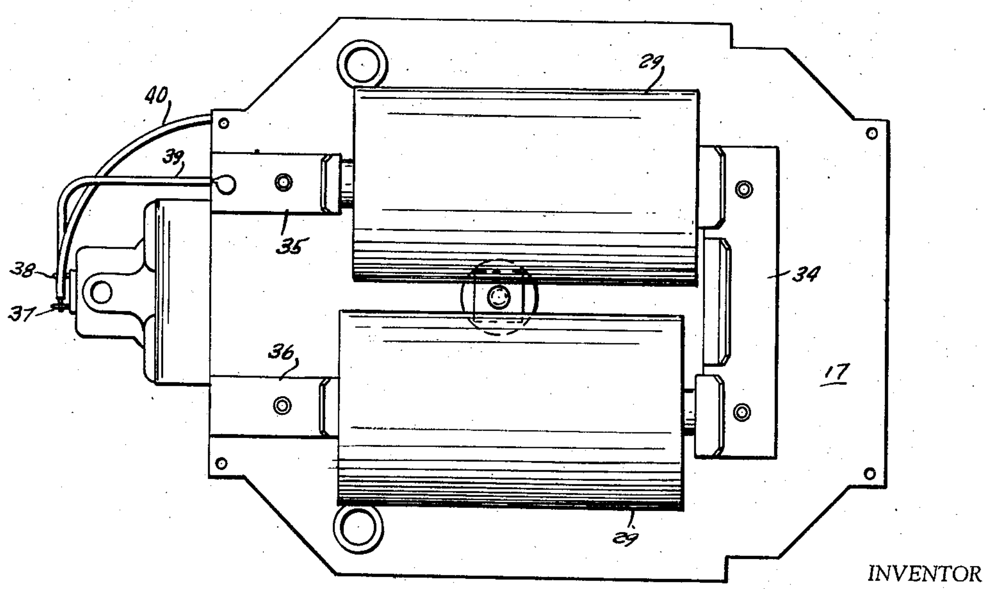
Figure 3 is a bottom end view of the phonograph unit removed from the housing.

The batteries 29 are arranged side by side but are oppositely disposed with respect to one another as clearly shown in Figure 3. Adjacent one end thereof, the batteries 29 are electrically connected together by a resilient contact member 34 riveted or otherwise secured to the underside of the base member 17. The contact member 34 extends across the bottom of the zinc casing of one battery or cell and the top of the center carbon pole of the other battery. Adjacent the opposite end thereof, the batteries 29 are connected by means of resilient contacts 35 and 36 to the brush terminals 37 and 38, respectively, of the motor 19 in the following manner: the brush terminal 37 is connected directly to the resilient contact finger 35 by means of a wire conductor 39. The other brush terminal 38 is connected by wire conductor 40 to a post 41 carried by the frame plate 16. Where, as in the embodiment illustrated, the frame plate 16 is composed of sheet metal and connected to the resilient contact finger 36 to provide a current path from the batteries 29, the post 41 is insulated from the frame plate.

Cooperating with the post 41 to provide a switch in the circuit between the batteries 29 and the motor 19 is a resilient contact arm 42 riveted or otherwise suitably secured to the frame plate 16. The arm 42 is normally maintained in engagement with the post 41 to close the motor circuit but is adapted to be flexed or otherwise moved out of engagement with respect to said post by a switch actuating member 43 when the stylus 14 of the sound reproducer 15 reaches the inner terminus of the sound track in the record 12 as will later appear.

Arm 43 is easily bendable to adjust for records ending at different radial distances. The shut-off groove in the record may be made deeper to ensure operation of switch 41—42 in the manner hereinafter pointed out.

The support of member 15 and stylus 14 is so resilient as hereinafter pointed out that no special compensation is needed to obtain proper needle pressure as records vary in thickness between reasonable limits.

Bracket 22 should be non-magnetic in order not to interfere with the magnetic properties of the motor.

The sound reproducer 15 is carried by a resilient supporting member 45 pivotally mounted for movement in a substantially horizontal plane above the turntable 10 on a supporting bracket 46 which in turn is mounted for rocking movement transversely to said first named plane as hereinafter more fully described.

The resilient supporting member 45 may be of any suitable design and construction, that shown by way of example comprising a flat substantially A-shaped frame of spring steel providing a pair of diverging legs 47 to which the base of the sound reproducer 15 is riveted or otherwise secured for movement therewith. In order to isolate the sound reproducer 15 acoustically from the resilient supporting member 45, rubber grommets 48 or other suitable sound insulating means may be employed as shown in Figure 1.

The bracket 46 is disposed adjacent one side of the supporting frame 16 and is provided with a pair of laterally extending ears 49 and 50 suitably spaced vertically from one another to accommodate a shaft or pin 51 therebetween. The shaft 51 extends transversely through the apex of the resilient supporting frame 45 and is welded or otherwise rigidly secured thereto, said shaft being rotatably supported at each end in aligned bearing openings 52 formed in the ears 49 and 50 to provide a pivotal connection between the resilient supporting frame 45 and the bracket 46 by means of which said frame and with it the sound reproducer 15 are oscillatable in a substantially horizontal plane across the face of the record disc 12.

As best seen in Figure 1, the ends of the shaft 51 are tapered or pointed as shown to form conical bearings 53 while the bearing openings 52 in the ears 49 and 50 of the supporting bracket 46 are cylindrical. Thus, the cooperative engagement between the bearings at each end of the shaft 51 is along a thin circular line, thereby reducing to a minimum the friction between the relatively rotating parts.

The switch actuating member 43 is suitably secured to the underside of the resilient frame 45 for movement therein and is constructed as shown with a vertical leg portion 43*a* extending downwardly from the frame to the underside of the turntable 10 and a horizontal leg portion 43*b* extending horizontally along the underside of said turntable a predetermined distance for engagement with the outer end of the resilient contact arm 42 at a predetermined point in the clockwise movement of the resilient frame on its pivot.

As hereinabove mentioned, the bracket 46 is adapted to be mounted for rocking movement transversely to the plane of movement of the resilient frame 45 on its pivot and for this purpose, the lower bracket ear 50 is longer than the upper ear 49 to extend a predetermined distance along the underside of the frame plate 16. Openings 56 and 57 are provided in the bracket ear 50 and in the frame plate 16, respectively, to receive and accommodate therebetween a pair of spherical bearings 58 employed as a fulcrum on which the bracket 46 may be rocked. A leaf spring 59 or other suitable means cooperates with the bracket ear 50 to maintain the latter in engagement with the fulcrum forming bearings 58. The spring 59 is riveted or otherwise secured at one end to the underside of the frame plate 16 and terminates at its opposite end in a bent upwardly extending portion 60 in engagement with the underside of the bracket ear 50 intermediate the ends of the latter to urge the bracket 46 in a counterclockwise direction as viewed in Figure 1.

In this manner, the shaft 51 is normally tilted from the vertical toward the left, flexing the resilient frame 45 and maintaining the stylus 14 of the sound reproducer 15 in engagement with the sound track in the record 12 with a predetermined spring pressure.

A coil spring 65 is supported by and surrounds the pin 51; the upper end of spring 65 bears against member 43*a* which in turn is secured to member 45 welded to pin 51. The lower end 68 is drawn out during assembly to wind the coils of spring 65 to predetermined tension and is then bent around bracket 68 for securement thereto. The direction of bias of spring 65 is to drive the pin 51, arm 45, sound reproducer 15 and stylus 14 outwardly toward the periphery of the record, or counterclockwise with respect to Figure 2.

Spring 65 also exerts a substantially uniform lateral pressure on the stylus in the sound track. This distinguishes markedly and successfully from prior devices wherein the pressure varied widely and caused uneven tracking or jumping of the track.

The bias of resilient member 45 is downwardly toward the record disc 12, thereby driving the stylus 14 firmly into engagement with the record disc groove 13.

Hence, irrespective of the attitude in space of the entire unit, the stylus 14 will track in groove 13 of record disc 12; the unit may even be inverted and the tracking will continue.

The spring 65 adds to the inertia of the sound reproducer thereby permitting the stylus more effectively to vibrate the material of the reproducer.

Bracket 46 carries an outwardly extending arm 70 which, when pressed down (with respect to Figure 1), will cause the entire bracket assembly including the arm 45, reproducer 15 and stylus 14 to rock about the pivot 58 upwardly or clockwise with respect to Figure 1.

The tensioned coil spring 65 will then, as soon as stylus 14 is disengaged from record disc 12, promptly swing the bracket 46 and all its elements including arm 45, reproducer 15 and stylus 14 outwardly.

The casing 80 of the device is so arranged that when the side of reproducer 15, on its outward swing strikes the inner wall of casing 80, the stylus 14 will be positioned above the lead-in groove of record disc 12.

The casing 80 may also be provided with an operating arm 81 which may be pressed down from outside to press down arm 70. Arm 81 may have a spring return if desired and may terminate in a push-button or some appropriately shaped depressable member on the outside of the toy or device in which the unit is mounted.

In operation, the normal at rest position of the elements is that in which the arm 45, reproducer 15 and stylus 14 have all moved toward the center of the record, clockwise with respect to Figure 1. In this position, arm section 43_b_ has opened switch 42—41 and the motor 19 is off.

When arm 70 is pressed down, either by arm 81 or in any other suitable way, then bracket 46 rocks (clockwise with respect to Figure 6) about pivot 58; arm, 45 reproducer 15 and stylus 14 are then lifted. Coil spring 65 then swings the arm 45, bracket 46, reproducer 15 and stylus 14 out as above described.

The initial outward movement disengages arm 43_b_ to permit switch 41—42 to close, thereby starting motor 19 and therefore starting the rotation of turntable 10 and disc 12. Release of arm 70 by releasing arm 81 now permits leaf spring 59—60 to rock bracket 46 and arm 45 back toward engagement of stylus 14 with record disc 12 and the sound reproduction begins. At the end of the groove, arm 43_b_ strikes switch element 42, opening switch 41—42 and the operation is halted to await the next pressing down of arm 70 or of the device to which arm 81 is attached.

It will be seen that my novel device is so arranged that it may readily be assembled by mass production techniques utilizing labor of limited skill. Thus, the bracket 46 and all its associated elements may be slipped into place by depressing end 60 of leaf spring 59. The coil spring 65 may be tensioned to the appropriate degree after assembly simply by pulling out end 68 by the desired amount and hooking it around bracket 46. These are ordinarily the most difficult operations in devices of this type.

In the foregoing I have described the invention solely in connection with specific illustrative embodiments thereof. Since many variations and modifications of the invention will now be obvious to those skilled in the art, I prefer to be bound not by the specific disclosures herein contained but only by the appended claims.

I claim:

1. A sound reproducing device comprising a support plate; a tone arm; a tone member mounted on the tone arm; a stylus mounted on the tone member; a bracket pivotally mounted on the support plate for movement in a plane normal to said support plate; said bracket pivotally supporting said tone arm and tone member for movement in a plane substantially parallel to the plane of the support plate; the pivotal mounting of the tone arm and tone member comprising a pin extending substantially normal to the support plate and rotatable on its axis in the bracket; the tone arm extending normally to the axis of said pin; a turntable extending parallel to said support plate; means carried by said pin biasing said tone arm toward a position where the stylus is at the outer edge of the turntable.

2. A sound reproducing device comprising a support plate; a tone arm; a tone member mounted on the tone arm; a stylus mounted on the tone member; a bracket pivotally mounted on the support plate for movement in a plane normal to said support plate; said bracket pivotally supporting said tone arm and tone member for movement in a plane substantially parallel to the plane of the support plate; the pivotal mounting of the tone arm and tone member comprising a pin extending substantially normal to the support plate and rotatable on its axis in the bracket; the tone arm extending normally to the axis of said pin; a turntable extending parallel to said support plate; means carried by said pin and biasing the tone member toward a position where the stylus is at the outer edge of the turntable; said means acting through said tone arm to bias the stylus against the outer edge of the groove of any record which may be placed on said turntable.

3. A sound reproducing device comprising a support plate; a tone arm; a tone member mounted on the tone arm; a stylus mounted on the tone member; a bracket pivotally mounted on the support plate for movement in a plane normal to said support plate; said bracket pivotally supporting said tone arm and tone member for movement in a plane substantially parallel to the plane of the support plate; the pivotal mounting of the tone arm and tone member comprising a pin extending substantially normal to the support plate and rotatable on its axis in the bracket; the tone arm extending normally to the axis of said pin; a turntable extending parallel to said support plate; a coil spring on said pin connected at one end to said tone arm and at the other end to a relatively stationary member biasing said tone arm to a position where the stylus is at the outer edge of the turntable.

4. A sound reproducing device comprising a support plate; a tone member; a stylus mounted on the tone member; a bracket pivotally mounted on the support plate for movement in a plane normal to said support plate; said bracket pivotally supporting said tone member for movement in a plane substantially parallel to the plane of the support plate; the pivotal mounting of the tone member comprising a pin extending substantially normal to the support plate and rotatable on its axis in the bracket; the tone member being secured to said pin and extending normally to the axis of said pin; a turntable extending parallel to said support plate; a coil spring on said pin anchored at one end to an element of the pin and at the other end to said bracket biasing said pin and said tone member to a position where the stylus is at the outer edge of the turntable.

References Cited in the file of this patent

UNITED STATES PATENTS

| | | |
|---|---|---|
| 1,206,013 | Manson | Nov. 28, 1916 |
| 1,631,797 | Cooke et al. | June 7, 1927 |
| 1,963,673 | Patino | June 19, 1934 |
| 2,162,006 | Franck et al. | June 13, 1939 |
| 2,296,489 | Ash et al. | Sept. 22, 1942 |